United States Patent
Iwase et al.

(10) Patent No.: US 9,915,213 B2
(45) Date of Patent: Mar. 13, 2018

(54) ENGINE

(71) Applicant: YANMAR CO., LTD., Osaka-shi, Osaka (JP)

(72) Inventors: Atsuhito Iwase, Osaka (JP); Tomohiro Otani, Osaka (JP); Yasuaki Oku, Osaka (JP); Yuki Fujimoto, Osaka (JP); Tomohiro Fukuda, Osaka (JP)

(73) Assignee: YANMAR CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/478,660

(22) Filed: Apr. 4, 2017

(65) Prior Publication Data

US 2017/0204798 A1 Jul. 20, 2017

Related U.S. Application Data

(63) Continuation of application No. 14/655,532, filed as application No. PCT/JP2013/074322 on Sep. 10, 2013, now Pat. No. 9,644,567.

(30) Foreign Application Priority Data

Dec. 25, 2012 (JP) ................................ 2012-281650
Dec. 25, 2012 (JP) ................................ 2012-281651

(51) Int. Cl.
*F02M 25/07* (2006.01)
*F02D 41/00* (2006.01)

(52) U.S. Cl.
CPC ..... *F02D 41/0077* (2013.01); *F02D 41/0052* (2013.01); *F02D 41/0072* (2013.01); *F02D 2200/0614* (2013.01)

(58) Field of Classification Search
CPC ..... F02D 2041/2055; F02D 2200/0404; F02D 41/005; F02M 25/07; F02M 25/0709; F02M 25/0776; F02M 25/0777
(Continued)

(56) References Cited

U.S. PATENT DOCUMENTS 4,984,553 A * 1/1991 Kako .................. F02D 41/32
                                                123/488
9,644,567 B2 * 5/2017 Iwase .................. F02D 41/401
(Continued)

FOREIGN PATENT DOCUMENTS

EP     1031719 A2    8/2000
EP     1154139 A2    11/2001
(Continued)

OTHER PUBLICATIONS

Extended European Search Report corresponding to Application No. 13868285.1-1606/2940276 PCT/JP2013/074322 dated Nov. 8, 2016.
(Continued)

*Primary Examiner* — John Kwon
(74) *Attorney, Agent, or Firm* — Cantor Colburn LLP

(57) ABSTRACT

The objective of the present invention is to provide an engine with improved startability and stable operation regardless of the driving environment and usage conditions. The engine is equipped with a control means, which calculates a standard injection timing on the basis of the target rotational frequency of the engine and a standard injection amount, that is, the amount of fuel injected, and which corrects the standard injection timing using at least one correction amount. A fuel injection control unit calculates a cooling water correction amount on the basis of the target rotational frequency of the engine, the standard injection amount, and the cooling water temperature, and when the cooling water temperature is less than a first prescribed temperature the control unit corrects the standard injection timing using only the cooling water correction amount.

3 Claims, 14 Drawing Sheets

(58) Field of Classification Search
USPC ............ 123/568.11, 568.21, 568.23, 568.25, 123/568.29
See application file for complete search history.

(56) References Cited

U.S. PATENT DOCUMENTS

| | | |
|---|---|---|
| 2003/0212484 A1 | 11/2003 | Takebayashi et al. |
| 2004/0060282 A1 | 4/2004 | Hirooka |
| 2005/0081511 A1 | 4/2005 | Tomita et al. |
| 2010/0204902 A1 | 8/2010 | Kuroki et al. |
| 2010/0256892 A1 | 10/2010 | Shartzer et al. |
| 2013/0312708 A1 | 11/2013 | Kuriyama et al. |

FOREIGN PATENT DOCUMENTS

| | | |
|---|---|---|
| EP | 1239142 A2 | 9/2002 |
| JP | H02136527 A | 5/1990 |
| JP | H08312404 A | 11/1996 |
| JP | H11148411 A | 11/1996 |
| JP | 2000220456 A | 8/2000 |
| JP | 2000356158 A | 12/2000 |
| JP | 2001355492 A | 12/2001 |
| JP | 2002266707 A | 9/2002 |
| JP | 2004124788 A | 4/2004 |
| JP | 2005009354 A | 1/2005 |
| JP | 2005140024 A | 6/2005 |
| JP | 2007032326 A | 2/2007 |
| JP | 2008002332 A | 1/2008 |
| JP | 2009270549 A | 11/2009 |
| JP | 2010156312 A | 7/2010 |
| JP | 2012031740 A | 2/2012 |

OTHER PUBLICATIONS

International Search Report corresponding to Application No. PCT/JP2013/074322; dated Oct. 8, 2013, with English translation.
U.S. Non-Final Office Action corresponding to U.S. Appl. No. 14/655,532, dated Sep. 8, 2016.

\* cited by examiner

ENGINE

CROSS REFERENCE TO RELATED APPLICATIONS

The present application is a continuation application of U.S. patent application Ser. No. 14/655,532, filed on Jun. 25, 2015, the entire contents of which are incorporated herein by reference and priority to which is hereby claimed. Application Ser. No. 14/655,532 is the U.S. national stage of Application No. PCT/JP2013/074322, filed on Sep. 10, 2013. Priority under 35 U.S.C. §119(a) and 35 U.S.C. §365(b) is claimed from Japanese Application No. 2012-281650, filed Dec. 25, 2012, and Japanese Application No. 2012-281651, filed Dec. 25, 2012, the disclosures of which are also incorporated herein by reference.

TECHNICAL FIELD

The present invention relates to an engine and more particularly relates to an engine that includes a fuel injection control device.

BACKGROUND ART

Conventionally, regarding diesel engines, there is a case where the vaporization of fuel is not facilitated at a cold start, and startability is reduced. Accordingly, there have been known fuel injection devices that correct a fuel injection time in such a manner as to intentionally advance the fuel injection time at the cold start. When the coolant temperature of the engine is lower than a predetermined temperature, correction is made in such a manner as to advance the fuel injection time until the coolant temperature reaches the predetermined temperature, which improves the startability of the engine. For example, Patent Literature 1 discloses the above-mentioned engine.

The fuel injection control device disclosed in Patent Literature 1 makes correction (advance correction) in which, when the coolant temperature is equal to or lower than a predetermined temperature at the start of the engine, an injection time is advanced. Also, generally, there is a case where the injection time is advanced and corrected based on an indicator except for the coolant temperature for the purpose of suppressing the generation of black smoke and the like. Accordingly, in some operating environments of the engine, there is a possibility that the injection time is excessively advanced and corrected not only by the coolant temperature but also by a plurality of indicators, and the operating state of the engine becomes unstable, or engine stall is caused.

CITATION LIST

Patent Literature

PTL 1: Japanese Unexamined Patent Application Publication No. 2007-32326

SUMMARY OF INVENTION

Technical Problem

The present invention has been achieved in view of the above-mentioned circumstances. It is an object of the present invention to provide an engine that improves startability and stabilizes operating states irrespective of operating environments and use modes.

Solution to Problem

Regarding the present invention, an engine may be configured to include a control means that calculates a standard injection time based on a target number of revolutions and a fuel injection amount of the engine and corrects the standard injection time, fuel injection pressure, a fuel injection interval, or the fuel injection amount based on at least a correction amount, and the control means is configured to calculate a coolant correction amount based on the target number of revolutions, the fuel injection amount, and a coolant temperature of the engine, and when the coolant temperature is less than a first predetermined temperature, the control means is configured to correct the standard injection time, the fuel injection pressure, the fuel injection interval, or the fuel injection amount only based on the coolant correction amount.

Regarding the present invention, when the coolant temperature is equal to or higher than a second predetermined temperature, the control means is configured to correct the standard injection time, the fuel injection pressure, the fuel injection interval, or the fuel injection amount based on at least the correction amount except for the coolant correction amount.

Regarding the present invention, the control means may be configured to set the first predetermined temperature and the second predetermined temperature in response to an outside temperature.

Advantageous Effects of Invention

As the effects of the present invention, the following advantageous effects are provided.

According to one aspect of the present invention, under the condition in which the coolant temperature Tm is substantially affected, the correction based on the coolant correction amount Wc can be preferentially performed. Accordingly, the startability is improved, and operating states are stabilized irrespective of operating environments and use modes.

According to another aspect of the present invention, under the condition in which the coolant temperature is slightly affected, the correction based on the coolant correction amount is not made. Accordingly, the startability is improved, and operating states are stabilized irrespective of operating environments and use modes.

According to another aspect of the present invention, correction conditions based on the coolant temperature are changed based on the outside temperature at the start of the engine. Accordingly, the startability is improved, and operating states are stabilized irrespective of operating environments and use modes.

DESCRIPTION OF EMBODIMENTS

Next, an engine 1 according to a first embodiment of the present invention will be described referring to FIG. 1.

Figure 1:
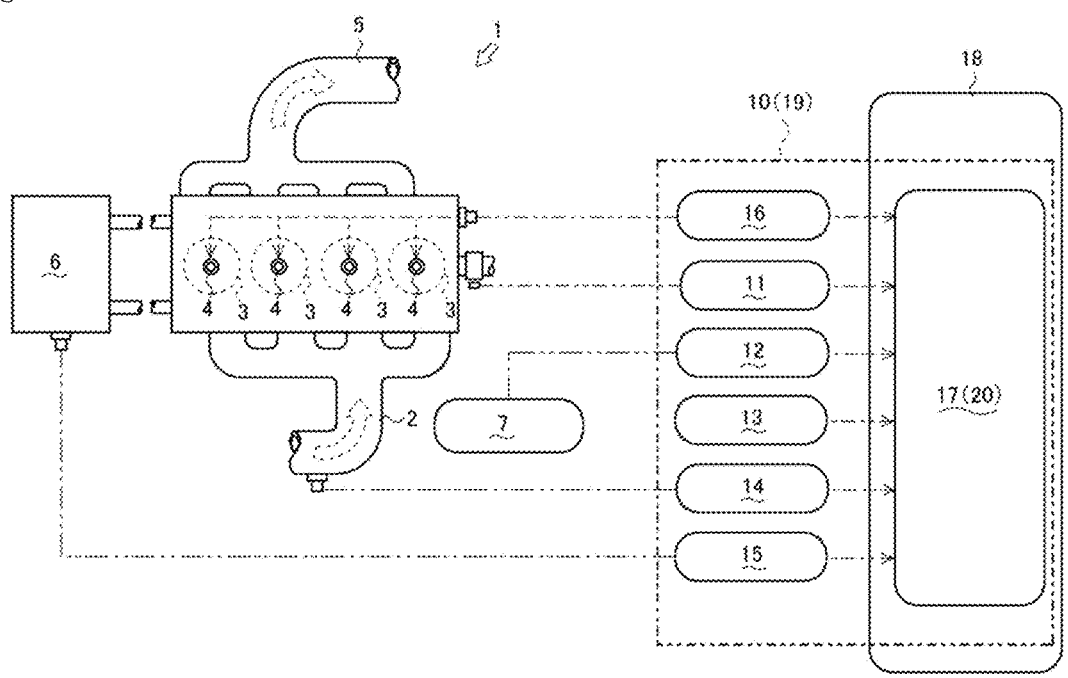
FIG. 1 is a schematic view illustrating the constitution of a fuel injection control device according to the present invention.

As illustrated in FIG. 1, the engine 1 is a diesel engine, and in the present embodiment, as illustrated in FIG. 1, the engine 1 is an inline four cylinder engine that includes four cylinders 3.

Regarding the engine 1, outside air supplied via an intake pipe 2 and fuel supplied from fuel injection valves 4 are mixed in the interior of cylinders 3 and combusted, thereby drivingly rotating an output shaft. The engine 1 discharges exhaust gas generated by the combustion of the fuel to the outside via an exhaust pipe 5. The engine 1 includes a fuel injection control device 10 that controls a fuel injection amount injected from the fuel injection valves 4 and an ECU 18 that controls the engine 1.

The fuel injection control device 10 serves to control fuel injection. The fuel injection control device 10 includes an engine revolution detecting unit 11 that detects the number of revolutions of the engine 1, an operation amount detecting unit 12 that detects the operation amount S of an accelerator 7, an atmospheric pressure/outside temperature detecting unit 13 that detects atmospheric pressure P and an outside temperature To, an intake flow amount detecting unit 14 that detects the flow amount of intake air, a coolant temperature detecting unit 15 that detects a coolant temperature Tm of the engine 1, a fuel injection pressure detecting unit 16 that detects fuel injection pressure Fp, and a fuel injection control unit 17 that is a control means for controlling the fuel injection.

The engine revolution detecting unit 11 serves to detect the number of revolutions N of the engine 1. The engine revolution detecting unit 11 is constituted by a rotary encoder and provided on the output shat of the engine 1. It is noted that, in the present embodiment, the engine revolution detecting unit 11 is constituted by the rotary encoder, but any may be applied as long as the number of revolutions N can be detected.

The operation amount detecting unit 12 serves to detect the operation amount S of the accelerator 7. The operation amount detecting unit 12 is constituted by a stroke sensor or an angle sensor and provided on the output lever of the accelerator 7. It is noted that, in the present embodiment, the operation amount detecting unit 12 is constituted by the stroke sensor or the angle sensor, but any may be applied as long as the operation amount S can be detected.

The atmospheric pressure/outside temperature detecting unit 13 serves to detect the atmospheric pressure P and the outside temperature To. The atmospheric pressure/outside temperature detecting unit 13 is constituted by an atmospheric pressure sensor, a temperature sensor, and the like and installed at a position where the atmospheric pressure P and the outside temperature To can be measured.

The intake flow amount detecting unit 14 serves to detect the intake flow amount F of the engine 1. The intake flow amount detecting unit 14 is constituted by a flow amount sensor and the like and installed in the intake pipe 2 of the engine 1.

The coolant temperature detecting unit 15 serves to detect the coolant temperature Tm of the engine 1. The coolant temperature detecting unit 15 is constituted by a temperature sensor and arranged in a radiator 6 that performs the heat exchange of the coolant of the engine 1.

The fuel injection pressure detecting unit 16 serves to detect the fuel injection pressure Fp of the fuel injection valves 4. The fuel injection pressure detecting unit 16 is constituted by a pressure sensor and the like and arranged in a fuel pipe, not illustrated, that supplies the fuel to the fuel injection valves 4.

The fuel injection control unit 17, which is the control means, stores various programs for performing the control of fuel injection, a revolution map M1 for calculating the target number of revolutions Nt of the engine 1 based on the operation amount S, a standard fuel injection amount map M2 for calculating a standard injection amount Qs based on the target number of revolutions Nt and the coolant temperature Tm, a standard injection time map M3 for calculating a standard injection time ITs of fuel based on the target number of revolutions Nt and the standard injection amount Qs, a coolant correction amount map M4 for calculating a standard coolant correction amount Wcs based on the target number of revolutions Nt and the standard injection amount Qs, a coolant temperature correction map M5 for calculating a coolant temperature correction coefficient Tmf based on the coolant temperature Tm, an atmospheric pressure correction amount map M6 for calculating a standard atmospheric pressure correction amount Pcs based on the target number of revolutions Nt and the standard injection amount Qs, an atmospheric pressure correction map M7 for calculating an atmospheric pressure correction coefficient Pf based on the atmospheric pressure P, a standard injection pressure map M8 for calculating a standard injection pressure IPs of the fuel based on the target number of revolutions Nt and the standard injection amount Qs, a standard injection interval map M9 for calculating a standard injection interval IIs of the fuel based on the target number of revolutions Nt and the standard injection amount Qs, a standard injection amount map M10 for calculating a standard injection amount IVs of the fuel based on the target number of revolutions Nt and the standard injection amount Qs, and the like.

The target number of revolutions Nt represents the number of revolutions of the engine 1 rotating at a constant speed in a no-load state in a case where the accelerator 7 is operated only by the operation amount S.

The standard injection amount Qs represents a fuel injection amount that serves as a standard for the target number of revolutions Nt at the coolant temperature Tm, in order to suppress the occurrence of the black smoke from the engine 1.

The standard injection time ITs represents a fuel injection time that serves as a standard for the target number of revolutions Nt and the standard injection amount Qs, which improves the startability of the engine 1 (prevents the engine stall) and suppresses the occurrence of the black smoke.

The standard coolant correction amount Wcs represents a correction amount that serves as a standard in a case where the coolant correction is made with respect to the target number of revolutions Nt and the standard injection amount Qs.

The coolant temperature correction coefficient Tmf represents a correction coefficient for calculating a coolant correction amount Wc at the coolant temperature Tm.

The standard atmospheric pressure correction amount Pcs represents a correction amount that serves as a standard in a case where atmospheric pressure is corrected with respect to the target number of revolutions Nt and the standard injection amount Qs.

The atmospheric pressure correction coefficient Pf represents a correction coefficient for calculating an atmospheric pressure correction amount Pc at the atmospheric pressure P.

The standard injection pressure IPs represents fuel injection pressure that serves as a standard for the target number of revolutions Nt and the standard injection amount Qs, which improves the startability of the engine 1 and suppresses the occurrence of the black smoke.

The standard injection interval IIs represents a fuel injection interval that serves as a standard for the target number of revolutions Nt and the standard injection amount Qs, which improves the startability of the engine 1 and suppresses the occurrence of the black smoke.

The standard injection amount IVs represents a fuel injection amount that serves as a standard for the target number of revolutions Nt and the standard injection amount Qs, which improves the startability of the engine 1 and suppresses the occurrence of the black smoke.

A first predetermined temperature Tm1 represents the threshold value of the coolant in a case where the correction of the standard injection time ITs is made only based on the correction for the coolant, in order to improve the startability of the engine 1 and suppress the occurrence of the black smoke.

A second predetermined temperature Tm2 represents the threshold value of the coolant in a case where the correction of the standard injection time ITs is made based on corrections except for the correction for the coolant, in order to improve the startability of the engine 1 and suppress the occurrence of the black smoke.

The ECU 18 serves to control the engine 1. In the ECU 18, various programs and data used for controlling the engine 1 are stored. The ECU 18 may be configured such that a CPU, a ROM, a RAM, an HDD, and the like are connected via a bus, or configured to be made up of one-chip LSI and the like. The ECU 18 includes the fuel injection control unit 17.

The fuel injection control unit 17 (ECU 18) is connected to the fuel injection valves 4 and can control the fuel injection valves 4.

The fuel injection control unit 17 is connected to the engine revolution detecting unit 11 and can acquire the number of revolutions N detected by the engine revolution detecting unit 11.

The fuel injection control unit 17 is connected to the operation amount detecting unit 12 and can acquire the operation amount S detected by the operation amount detecting unit 12.

The fuel injection control unit 17 is connected to the atmospheric pressure/outside temperature detecting unit 13 and can acquire the atmospheric pressure P and the outside temperature To detected by the atmospheric pressure/outside temperature detecting unit 13.

The fuel injection control unit 17 is connected to the intake flow amount detecting unit 14 and can acquire the intake flow amount F detected by the intake flow amount detecting unit 14.

The fuel injection control unit 17 is connected to the coolant temperature detecting unit 15 and can acquire the coolant temperature Tm detected by the coolant temperature detecting unit 15.

The fuel injection control unit 17 is connected to the fuel injection pressure detecting unit 16 and can acquire the fuel injection pressure Fp detected by the fuel injection pressure detecting unit 16.

The fuel injection control unit 17 can calculate the target number of revolutions Nt from the revolution map M1 based on the operation amount S acquired.

The fuel injection control unit 17 can calculate an excess air ratio $\lambda$ based on the intake flow amount F and the atmospheric pressure P acquired.

The fuel injection control unit 17 can calculate the standard injection amount Qs from the standard fuel injection amount map M2 based on the coolant temperature Tm acquired and the target number of revolutions Nt calculated.

The fuel injection control unit 17 can calculate the standard injection time ITs from the standard injection time map M3 based on the target number of revolutions Nt and the standard injection amount Qs calculated.

The fuel injection control unit 17 can calculate the standard coolant correction amount Wcs from the coolant correction amount map M4 based on the target number of revolutions Nt and the standard injection amount Qs calculated.

The fuel injection control unit 17 can calculate the coolant temperature correction coefficient Tmf from the coolant temperature correction map M5 based on the coolant temperature Tm acquired.

The fuel injection control unit 17 can calculate the standard atmospheric pressure correction amount Pcs from the atmospheric pressure correction amount map M6 based on the target number of revolutions Nt and the standard injection amount Qs calculated.

The fuel injection control unit 17 can calculate the atmospheric pressure correction coefficient Pf from the atmospheric pressure correction map M7 based on the atmospheric pressure P acquired.

The fuel injection control unit 17 can calculate the standard injection pressure IPs from the standard injection pressure map M8 based on the target number of revolutions Nt and the standard injection amount Qs calculated.

The fuel injection control unit 17 can calculate the standard injection interval IIs from the standard injection interval map M9 based on the target number of revolutions Nt and the standard injection amount Qs calculated.

The fuel injection control unit 17 can calculate the standard injection amount IVs from the standard injection amount map M10 based on the target number of revolutions Nt and the standard injection amount Qs calculated.

The fuel injection control unit 17 can calculate the coolant correction amount Wc from the standard coolant correction amount Wcs and the coolant temperature correction coefficient Tmf calculated.

The fuel injection control unit 17 can calculate the atmospheric pressure correction amount Pc from the standard atmospheric pressure correction amount Pcs and the atmospheric pressure correction coefficient Pf calculated.

The fuel injection control unit 17 can advance and correct the standard injection time ITs, or delay and correct the standard injection time ITs at an appropriate injection time based on the coolant correction amount Wc and the atmospheric pressure correction amount Pc calculated.

The ECU 18 can control the engine 1 based on the operation amount S, the number of revolutions N, the target number of revolutions Nt, the standard injection amount Qs, and the standard injection time ITs that are acquired via the fuel injection control unit 17.

Hereinafter, the control mode of correcting the injection time of the fuel injection control unit 17 after the start of the engine 1 according to the first embodiment of the present invention will be described referring to FIGS. 2 and 3.

Figure 2:
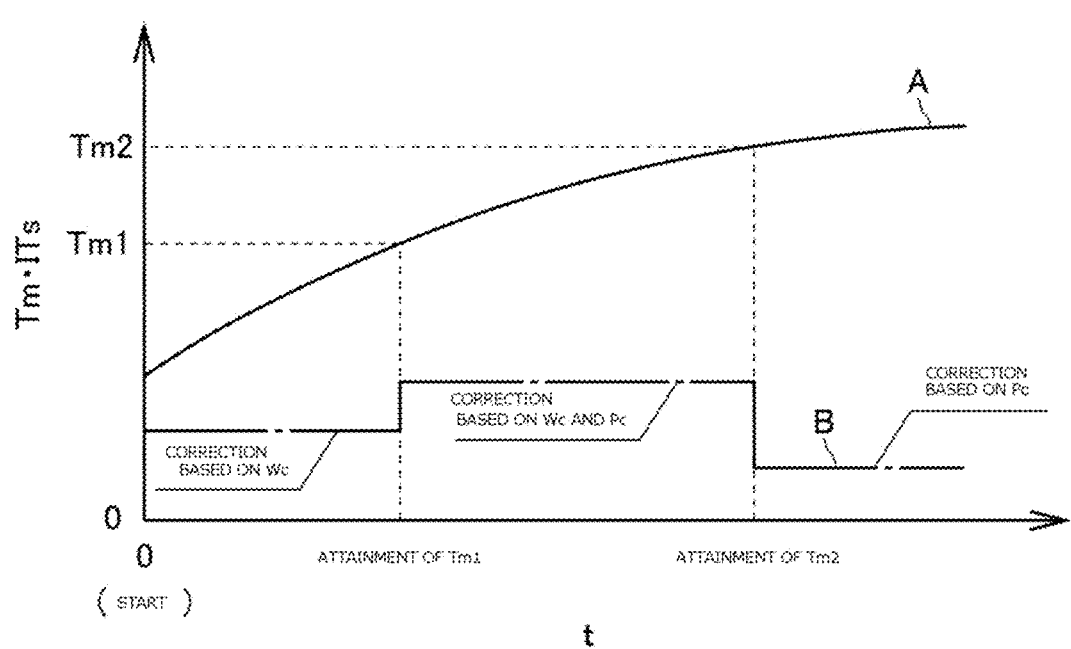
FIG. 2 is a view illustrating a graph representing a relation of a coolant temperature and a correction amount of an injection time from the start of an engine.

As illustrated in FIG. 2, the fuel injection control unit 17 controls in such a manner that the standard injection time ITs (see a line B in FIG. 2) is advanced and corrected based on the coolant correction amount Wc until the coolant temperature Tm (see a line A in FIG. 2) reaches the first predetermined temperature Tm1 after the start of the engine 1. Also, the fuel injection control unit 17 controls in such a manner that the standard injection time ITs is advanced and corrected based on the coolant correction amount Wc and the atmospheric pressure correction amount Pc until the coolant temperature Tm, which has reached the first predetermined temperature Tm1 after the start of the engine 1, reaches the second predetermined temperature Tm2. Then, when the coolant temperature Tm reaches the second predetermined temperature Tm2 after the start of the engine 1, the fuel injection control unit 17 controls in such a manner that the standard injection time ITs is advanced and corrected based on the atmospheric pressure correction amount Pc. It is noted that, in the present embodiment, the correction amount except for the coolant correction amount Wc is represented as the atmospheric pressure correction amount Pc, but not limited to this.

Figure 3:
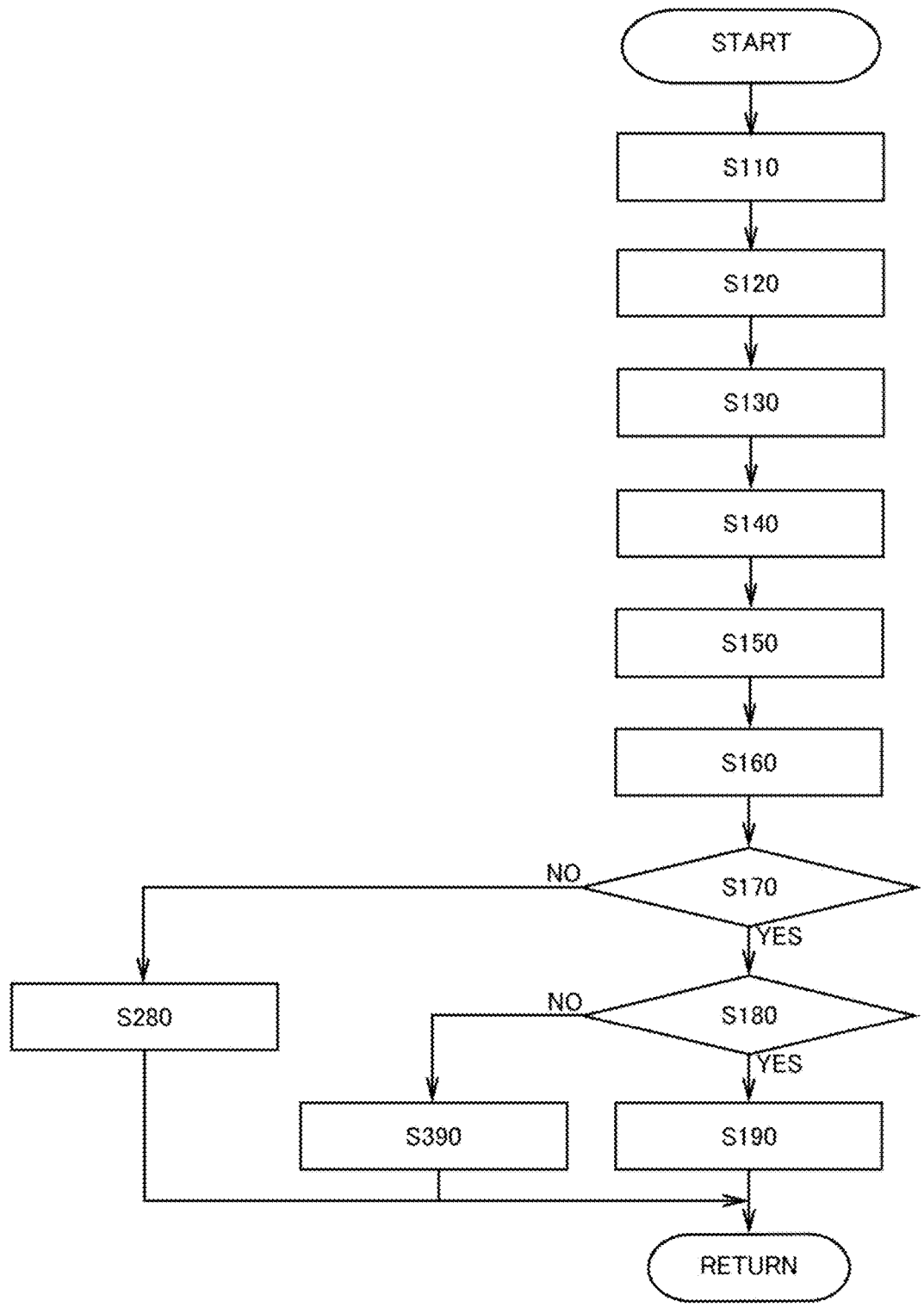
FIG. 3 is a view illustrating a flowchart representing the control mode of correcting the injection time of the first embodiment of the fuel injection control device according to the present invention.

Next, the control mode of correcting the injection time of the fuel injection control unit 17 will be specifically described referring to FIG. 3.

As illustrated in FIG. 3, after the start of the engine 1, at Step S110, the fuel injection control unit 17 of the fuel injection control device 10 acquires the operation amount S detected by the operation amount detecting unit 12, the atmospheric pressure P and the outside temperature To detected by the atmospheric pressure/outside temperature detecting unit 13, the intake flow amount F detected by the intake flow amount detecting unit 14, and the coolant temperature Tm detected by the coolant temperature detecting unit 15 and allows the Step to transfer to Step S120.

At the Step S120, the fuel injection control unit 17 calculates the target number of revolutions Nt from the revolution map M1 based on the operation amount S acquired, calculates the standard injection amount Qs from the standard fuel injection amount map M2 based on the coolant temperature Tm acquired and the target number of revolutions Nt calculated, and allows the Step to transfer to Step S130.

At the Step S130, the fuel injection control unit 17 calculates the standard injection time ITs from the standard injection time map M3 based on the target number of revolutions Nt and the standard injection amount Qs calculated, and allows the Step to transfer to Step S140.

At the Step S140, the fuel injection control unit 17 calculates the standard coolant correction amount Wcs from the coolant correction amount map M4 based on the target number of revolutions Nt and the standard injection amount Qs calculated, calculates the coolant temperature correction coefficient Tmf from the coolant temperature correction map M5 based on the coolant temperature Tm, and allows the Step to transfer to Step S150.

At the Step S150, the fuel injection control unit 17 calculates the standard atmospheric pressure correction amount Pcs from the atmospheric pressure correction amount map M6 based on the target number of revolutions Nt and the standard injection amount Qs calculated, calculates the atmospheric pressure correction coefficient Pf from the atmospheric pressure correction map M7 based on the atmospheric pressure P acquired, and allows the Step to transfer to Step S160.

At the Step S160, the fuel injection control unit 17 calculates the coolant correction amount Wc based on the standard coolant correction amount Wcs and the coolant temperature correction coefficient Tmf calculated, calculates the atmospheric pressure correction amount Pc based on the standard atmospheric pressure correction amount Pcs and the atmospheric pressure correction coefficient Pf calculated, and allows the Step to transfer to Step S170.

At the Step S170, the fuel injection control unit 17 determines whether or not the coolant temperature Tm acquired is equal to or higher than the first predetermined temperature Tm1. As a result, when it is determined that the coolant temperature Tm acquired is equal to or higher than the first predetermined temperature Tm1, the fuel injection control unit 17 allows the Step to transfer to Step S180. In contrast, when it is determined that the coolant temperature Tm acquired is less than the first predetermined temperature Tm1, the fuel injection control unit 17 allows the Step to transfer to Step S280.

At the Step S180, the fuel injection control unit 17 determines whether or not the coolant temperature Tm acquired is equal to or higher than the second predetermined temperature Tm2. As a result, when it is determined that the coolant temperature Tm acquired is equal to or higher than the second predetermined temperature Tm2, the fuel injection control unit 17 allows the Step to transfer to Step S190. In contrast, when it is determined that the coolant temperature Tm acquired is less than the second predetermined temperature Tm2, the fuel injection control unit 17 allows the Step to transfer to Step S390.

At the Step S190, the fuel injection control unit 17 corrects the standard injection time ITs calculated based on the atmospheric pressure correction amount Pc calculated and returns the Step to the Step S110. That is, the fuel injection control unit 17 does not use the coolant correction amount Wc for the correction of the standard injection time ITs.

At the Step S280, the fuel injection control unit 17 corrects the standard injection time ITs calculated based on the coolant correction amount Wc and returns the Step to the Step S110. That is, the fuel injection control unit 17 does not use the atmospheric pressure correction amount Pc for the correction of the standard injection time ITs.

At the Step S390, the fuel injection control unit 17 corrects the standard injection time ITs calculated based on the coolant correction amount Wc and the atmospheric pressure correction amount Pc and returns the Step to the Step S110.

In this manner, regarding the engine 1, when the coolant temperature Tm is less than the first predetermined temperature Tm1, at which the temperature is substantially affected by the startability of the engine 1 or the occurrence of the black smoke, the correction of the standard injection time ITs is made only based on the coolant correction amount Wc. As a result, the injection time is not excessively advanced and corrected due to the addition of the coolant correction amount Wc and the atmospheric pressure correction amount Pc.

Also, regarding the engine 1, when the coolant temperature Tm is equal to or higher than the first predetermined temperature Tm1 at which the temperature is substantially affected by the startability of the engine 1 or the occurrence of the black smoke, and less than the second predetermined temperature Tm2 at which the atmospheric pressure is substantially affected by the startability of the engine 1 or the occurrence of the black smoke, the correction of the standard injection time ITs is made based on the coolant correction amount Wc and the atmospheric pressure correction amount Pc. As a result, the injection time is appropriately advanced and corrected based on the coolant correction amount Wc and the atmospheric pressure correction amount Pc.

Also, regarding the engine 1, when the coolant temperature Tm is equal to or higher than the second predetermined temperature Tm2, at which the atmospheric pressure is substantially affected by the startability of the engine 1 or the occurrence of the black smoke, the correction of the standard injection time ITs is made based on the atmospheric pressure correction amount Pc. As a result, the injection time is not excessively advanced and corrected due to the addition of the coolant correction amount Wc and the atmospheric pressure correction amount Pc. In the present embodiment, when the coolant temperature Tm is equal to or higher than the second predetermined temperature Tm2, the correction of the standard injection time ITs is made based on the atmospheric pressure correction amount Pc, but not limited to this. At least a correction amount (for example, an outside air temperature, a lubricant temperature, and an elapsed time from the start of the engine 1) except for the atmospheric pressure correction amount Pc may be applied.

Figure 4:
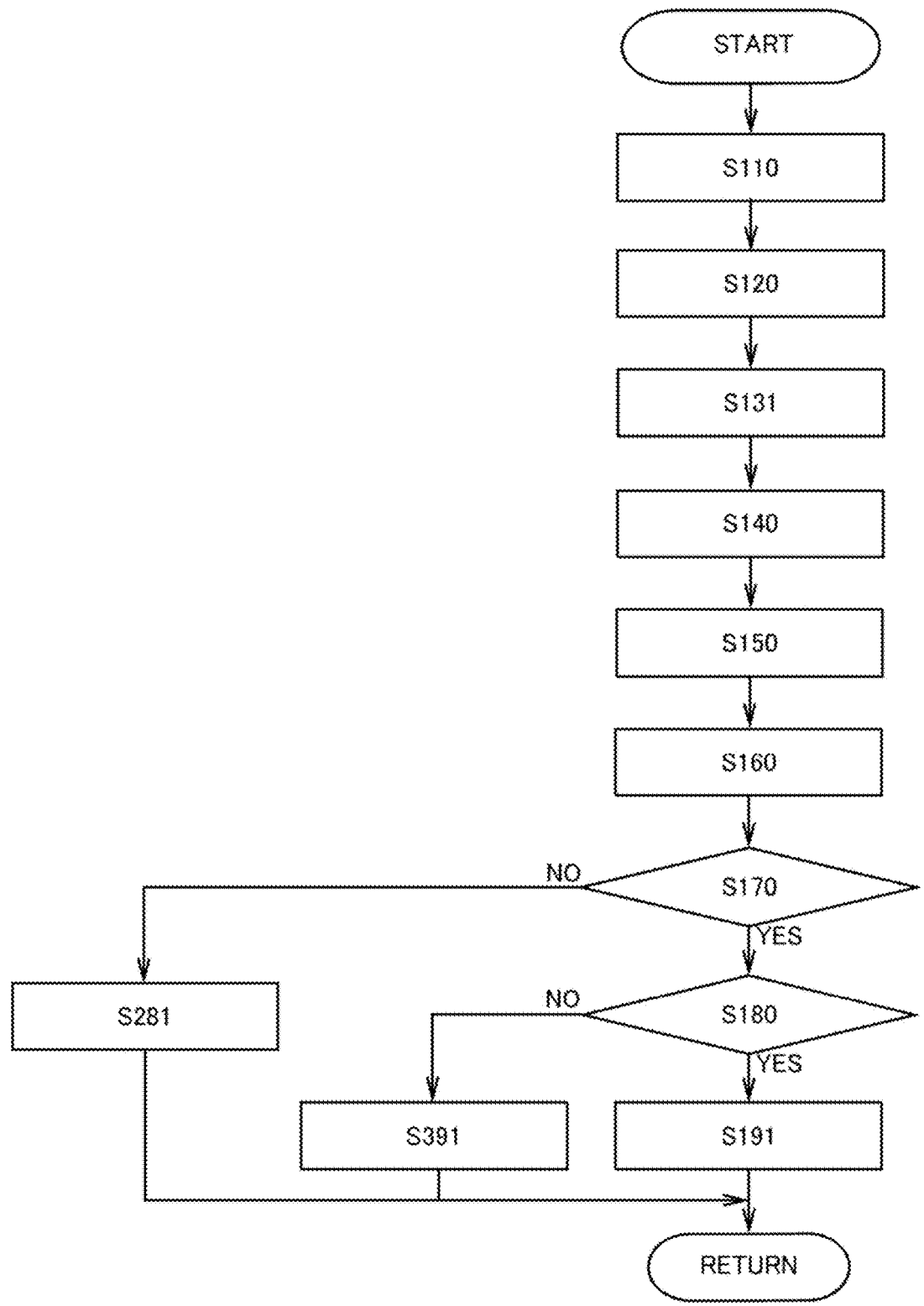
FIG. 4 is a view illustrating a flowchart representing the control mode of correcting the injection pressure of the first embodiment of the fuel injection control device according to the present invention.

Hereinafter, the control mode of correcting the injection pressure of the fuel injection control unit 17 after the start of the engine 1 according to the first embodiment of the present invention will be described referring to FIG. 4. It is noted that, in the embodiment described below, regarding the same matters of the embodiments that have been already described, their specific descriptions are omitted, and the following description focuses on the different matters.

The same control described above is performed from the Steps S110 to S120.

At Step S131, the fuel injection control unit 17 calculates the standard injection pressure IPs from the standard injection pressure map M8 based on the target number of revolutions Nt and the standard injection amount Qs calculated and allows the Step to transfer to the Step S140.

The same control described above is performed from the Steps S140 to S180.

At Step S191, the fuel injection control unit 17 corrects the standard injection pressure IPs calculated, based on the atmospheric pressure correction amount Pc calculated and returns the Step to the Step S110. That is, the fuel injection control unit 17 does not use the coolant correction amount Wc for the correction of the standard injection pressure IPs.

At Step S281, the fuel injection control unit 17 corrects the standard injection pressure IPs calculated, based on the coolant correction amount Wc and returns the Step to the Step S110. That is, the fuel injection control unit 17 does not use the atmospheric pressure correction amount Pc for the correction of the standard injection pressure IPs.

At Step S391, the fuel injection control unit 17 corrects the standard injection pressure IPs calculated, based on the coolant correction amount Wc and the atmospheric pressure correction amount Pc and returns the Step to the Step S110.

Figure 5:
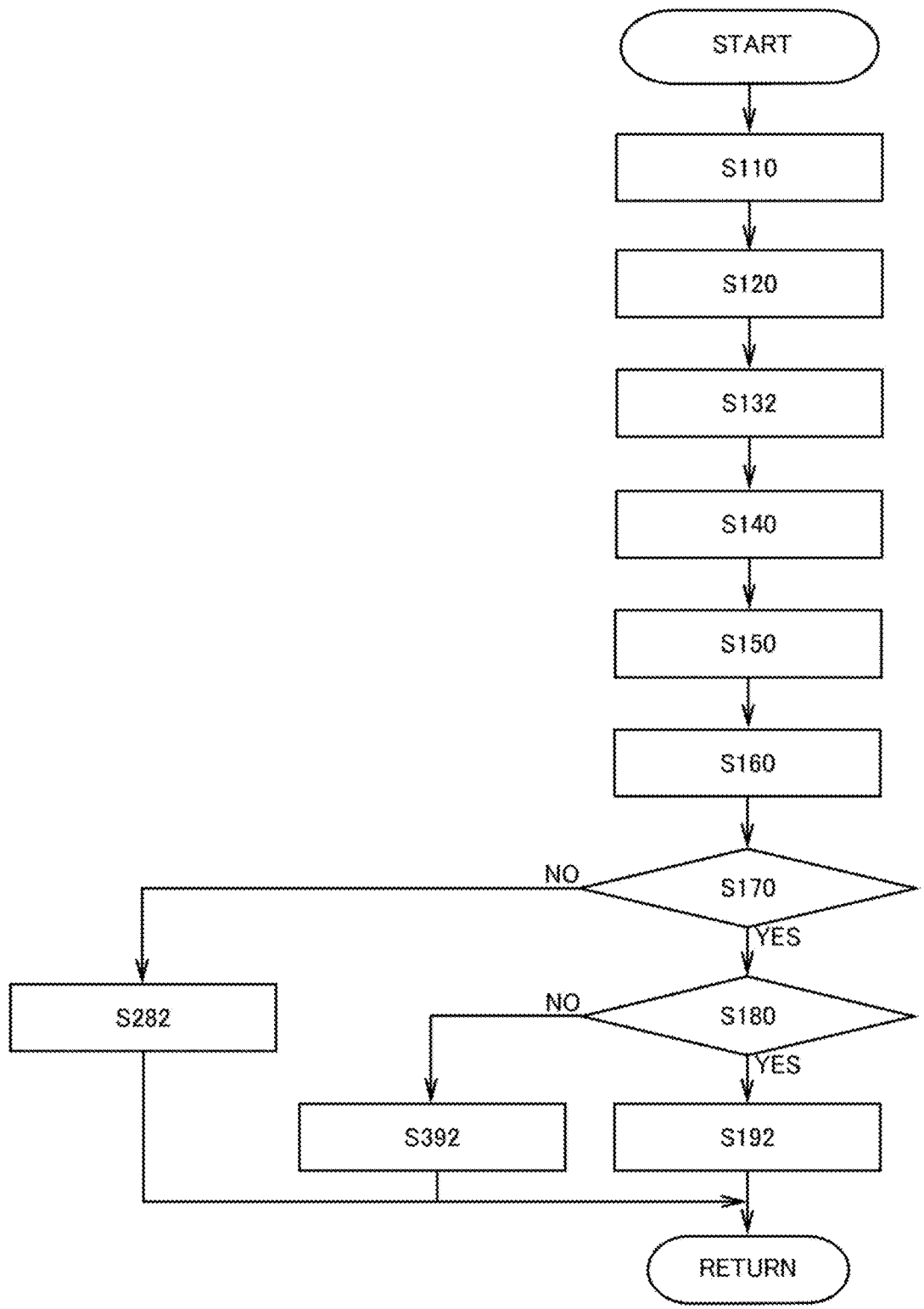
FIG. 5 is a view illustrating a flowchart representing the control mode of correcting the injection intervals of the first embodiment of the fuel injection control device according to the present invention.

Hereinafter, the control mode of correcting the injection intervals of the fuel injection control unit 17 after the start of the engine 1 according to the first embodiment of the present invention will be described referring to FIG. 5. It is noted that, in the embodiment described below, regarding the same matters of the embodiments that have been already described, their specific descriptions are omitted, and the following description focuses on the different matters.

The same control described above is performed from the Steps S110 to S120.

At Step S132, the fuel injection control unit 17 calculates the standard injection interval IIs from the standard injection interval map M9 based on the target number of revolutions Nt and the standard injection amount Qs calculated and allows the Step to transfer to the Step S140.

The same control described above is performed from the Steps S140 to S180.

At Step S192, the fuel injection control unit 17 corrects the standard injection interval IIs calculated, based on the atmospheric pressure correction amount Pc calculated and returns the Step to the Step S110. That is, the fuel injection control unit 17 does not use the coolant correction amount Wc for the correction of the standard injection interval IIs.

At Step S282, the fuel injection control unit 17 corrects the standard injection interval IIs calculated, based on the coolant correction amount Wc and returns the Step to the Step S110. That is, the fuel injection control unit 17 does not use the atmospheric pressure correction amount Pc for the correction of the standard injection interval IIs.

At Step S392, the fuel injection control unit 17 corrects the standard injection interval IIs calculated, based on the coolant correction amount Wc and the atmospheric pressure correction amount Pc and returns the Step to the Step S110.

Figure 6:
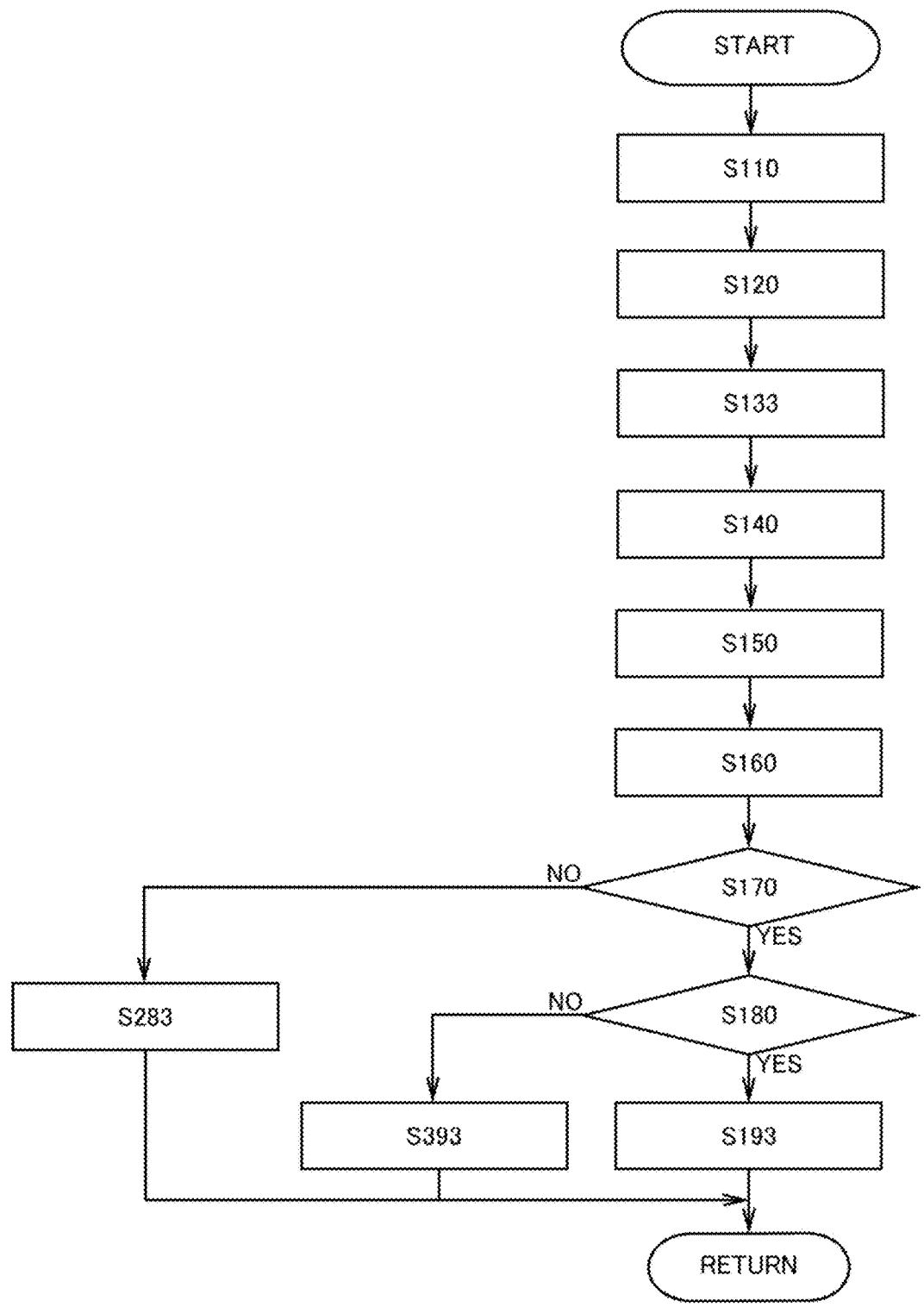
FIG. 6 is a view illustrating a flowchart representing the control mode of correcting the injection amount of the first embodiment of the fuel injection control device according to the present invention.

Hereinafter, the control mode of correcting the injection amount of the fuel injection control unit 17 after the start of the engine 1 according to the first embodiment of the present invention will be described referring to FIG. 6. It is noted that, in the embodiment described below, regarding the same matters of the embodiments that have been already described, their specific descriptions are omitted, and the following description focuses on the different matters.

The same control described above is performed from the Steps S110 to S120.

At the Step S133, the fuel injection control unit 17 calculates the standard injection amount IVs from the standard injection amount map M10 based on the target number of revolutions Nt and the standard injection amount Qs calculated and allows the Step to transfer to the Step S140.

The same control described above is performed from the Steps S140 to S180.

At the Step S193, the fuel injection control unit 17 corrects the standard injection amount IVs calculated, based on the atmospheric pressure correction amount Pc calculated and returns the Step to the Step S110. That is, the fuel injection control unit 17 does not use the coolant correction amount Wc for the correction of the standard injection amount IVs.

At the Step S283, the fuel injection control unit 17 corrects the standard injection amount IVs calculated, based on the coolant correction amount Wc and returns the Step to the Step S110. That is, the fuel injection control unit 17 does not use the atmospheric pressure correction amount Pc for the correction of the standard injection amount IVs.

At the Step S393, the fuel injection control unit 17 corrects the standard injection amount IVs calculated, based on the coolant correction amount Wc and the atmospheric pressure correction amount Pc and returns the Step to the Step S110.

As described above, the engine 1 according to the first embodiment of the present invention includes the fuel injection control device 10 including the fuel injection control unit 17, which is the control means that calculates the standard injection time ITs based on the target number of revolutions Nt of the engine 1 and the standard injection amount Qs, which is the fuel injection amount, and that corrects the standard injection time ITs, the standard injection pressure IPs, the standard injection interval IIs, or the standard injection amount IVs based on at least a correction amount, and the fuel injection control unit 17 calculates the coolant correction amount Wc based on the target number of revolutions Nt, the standard injection amount Qs, and the coolant temperature Tm of the engine 1, and when the coolant temperature Tm is less than the first predetermined temperature Tm1, the fuel injection control unit 17 corrects the standard injection time ITs, the standard injection pressure IPs, the standard injection interval IIs, or the standard injection amount IVs only based on the coolant correction amount Wc.

With this constitution, under the condition in which the coolant temperature Tm is substantially affected, the correction based on the coolant correction amount Wc can be preferentially performed. Accordingly, the startability is improved, and operating states are stabilized irrespective of operating environments and use modes.

Also, when the coolant temperature Tm is equal to or higher than the second predetermined temperature Tm2, the fuel injection control unit 17 corrects the standard injection time ITs based on the atmospheric pressure correction amount Pc, which is one of correction coefficients except for the coolant correction amount Wc.

With this constitution, under the condition in which the coolant temperature Tm is slightly affected, the correction based on the coolant correction amount Wc is not made. Accordingly, the startability is improved, and operating states are stabilized irrespective of operating environments and use modes.

Next, the engine 1 of a second embodiment of the engine according to the present invention will be described referring to FIGS. 1 and 7. The engine 1 includes a fuel injection control device 19. The fuel injection control device 19 includes a fuel injection control unit 20 and calculates the first predetermined temperature Tm1 and the second predetermined temperature Tm2 in accordance with the outside temperature To. It is noted that the standard injection time will be described in the following embodiment, out of control modes of the standard injection time, the fuel injection pressure, the fuel injection interval, or the fuel injection amount of the fuel injection control unit 17. It is noted that, regarding the same matters of the embodiments that have been already described, their specific descriptions are omitted, and the following description focuses on the different matters.

As illustrated in FIG. 1, the fuel injection control unit 20 stores a predetermined temperature calculating map M11 for calculating the first predetermined temperature Tm1 and the second predetermined temperature Tm2 from the outside temperature To. The fuel injection control unit 20 performs a predetermined calculation in accordance with these programs and the like and stores the results of the calculation.

The fuel injection control unit 20 can calculate the first predetermined temperature Tm1 and the second predetermined temperature Tm2 from the predetermined temperature calculating map M11 based on the outside temperature To acquired.

Hereinafter, the mode of fuel injection control after the start of the engine 1 of the fuel injection control device 19 according to the second embodiment of the present invention will be described referring to FIG. 7.

Figure 7:
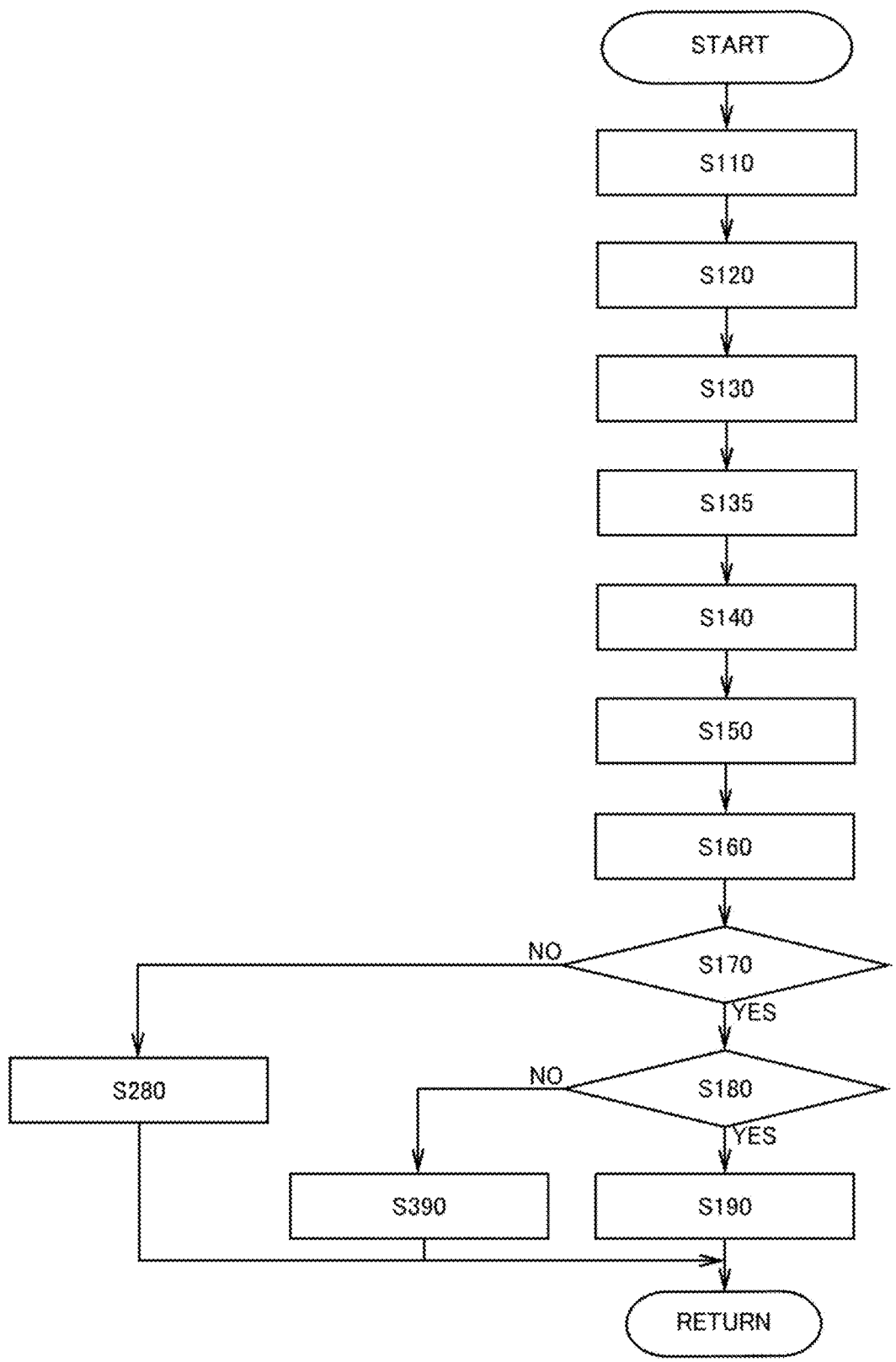
FIG. 7 is a view illustrating a flowchart representing the control mode of correcting the injection time of the second embodiment of the fuel injection control device according to the present invention.

As illustrated in FIG. 7, at Step S135, the fuel injection control unit 20 calculates the first predetermined temperature Tm1 and the second predetermined temperature Tm2 from the predetermined temperature calculating map M11 based on the outside temperature To acquired and allows the Step to transfer to the Step S140. It is noted that, in the present embodiment, any one of the first predetermined temperature Tm1 and the second predetermined temperature Tm2 may be regarded as a calculated value based on the outside temperature To.

As described above, regarding the engine 1 according to the second embodiment of the present invention, the fuel injection control unit 20, which is a control means, sets the first predetermined temperature Tm1 and the second predetermined temperature Tm2 in accordance with the outside temperature To.

With this constitution, correction conditions based on the coolant temperature Tm are changed based on the outside temperature To at the start of the engine 1. Accordingly, the startability is improved, and operating states are stabilized irrespective of operating environments and use modes.

Hereinafter, an engine 21 according to a third embodiment will be described referring to FIG. 8.

Figure 8:
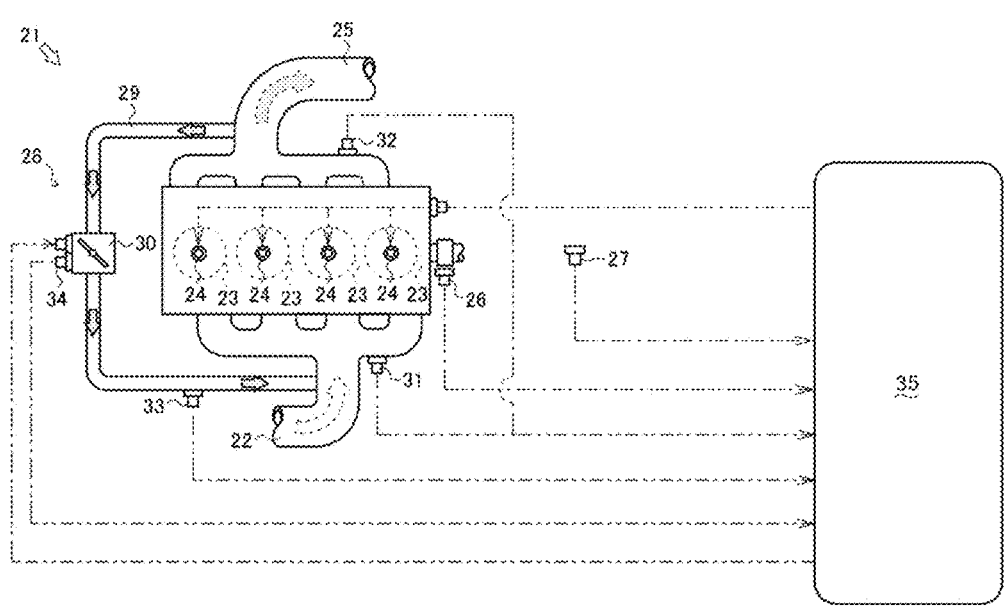
FIG. 8 is a schematic view illustrating the constitution of the engine according to a third embodiment.

As illustrated in FIG. 8, the engine 21 is a diesel engine 21, and in the present embodiment, an inline four cylinder engine 21 that includes four cylinders 23.

Regarding the engine 21, intake air supplied to the interior of the cylinders 23 via an intake pipe 22 and fuel supplied from fuel injection valves 24 to the interior of the cylinders 23 are mixed in the interior of cylinders 23 and combusted, thereby drivingly rotating an output shaft. The engine 21 discharges exhaust gas generated by the combustion of the fuel to the outside via an exhaust pipe 25.

The engine 21 includes an engine revolution detecting sensor 26, an injection amount detecting sensor 27 of the fuel injection valves 24, an EGR device 28, and an ECU 35, which is a control device.

The engine revolution detecting sensor 26 serves to detects the number of revolutions N of the engine 21. The engine revolution detecting sensor 26 is constituted by a sensor and a pulsar and provided on the output shaft of the engine 21. It is noted that, in the present embodiment, the engine revolution detecting sensor 26 is constituted by the sensor and the pulsar, but any may be applied as long as the number of revolutions N can be detected.

The injection amount detecting sensor 27 serves to detect an injection amount f of fuel injected from the fuel injection valves 24. The injection amount detecting sensor 27 is provided in a midway portion of a fuel supply pipe not illustrated. The injection amount detecting sensor 27 is constituted by a flow amount sensor. It is noted that, in the present embodiment, the injection amount detecting sensor 27 is constituted by the flow amount sensor, but not limited to this, and any may be applied as long as the injection amount f of fuel can be detected.

The EGR device 28 recirculates part of the exhaust gas into the intake air. The EGR device 28 includes an EGR pipe 29, an EGR valve 30, an intake pressure detecting sensor 31, an exhaust pressure detecting sensor 32, an EGR gas temperature detecting sensor 33, an opening degree detecting sensor 34, and an ECU 35, which is an EGR control unit.

The EGR pipe 29 is a pipe that guides the exhaust gas to the intake pipe 22. The EGR pipe 29 is provided in such a manner that the intake pipe 22 and the exhaust pipe 25 are communicated. Accordingly, part of the exhaust gas passing through the exhaust pipe 25 is guided to the intake pipe 22 via the EGR pipe 29. That is, it is configured such that part of the exhaust gas can be recirculated into the intake air as the EGR gas (hereinafter, merely referred to as "EGR gas").

The EGR valve 30 serves to limit the flow amount of the EGR gas passing through the EGR pipe 29. The EGR valve 30 is constituted by the electromagnetic flow control valve of a normal closed-type. The EGR valve 30 is provided in the midway portion of the EGR pipe 29. The EGR valve 30 can acquire a signal from the ECU 35 described later and change the opening degrees of the EGR valve 30. It is noted that, in the present embodiment, the EGR valve 30 is constituted by the electromagnetic flow control valve of a normal closed-type, but any may be applied as long as the flow amount of the EGR gas can be limited.

The intake pressure detecting sensor 31 constituting a differential pressure detecting means serves to detect intake pressure P1. The intake pressure detecting sensor 31 is provided in the midway portion of the intake pipe 22 that can detect the intake pressure P1. Similarly, the exhaust pressure detecting sensor 32 constituting the differential pressure detecting means serves to detect exhaust pressure P2. The exhaust pressure detecting sensor 32 is provided in the midway portion of the exhaust pipe 25 that can detect the exhaust pressure P2.

The EGR gas temperature detecting sensor 33 serves to detect an EGR gas temperature Tegr. The EGR gas temperature detecting sensor 33 is constituted by a thermocouple. The EGR gas temperature detecting sensor 33 is provided in the midway portion of the EGR pipe 29 that can detect the EGR gas temperature Tegr. It is noted that, in the present embodiment, the EGR gas temperature detecting sensor 33 is constituted by the thermocouple, but any may be applied as long as the EGR gas temperature Tegr can be detected.

The opening degree detecting sensor 34 serves to detect an EGR-valve opening degree G. The opening degree detecting sensor 34 is constituted by a position detecting sensor. The opening degree detecting sensor 34 is provided in the EGR valve 30. It is noted that, in the present embodiment, the opening degree detecting sensor 34 is constituted by the position detecting sensor, but any may be applied as long as the EGR-valve opening degree G can be detected.

The ECU 35 serves to control the engine 21. Specifically, the ECU 35 controls the main body of the engine 21 and the EGR device 28. The ECU 35 stores various programs and data used for performing the control of the engine 21. The ECU 35 may be configured such that a CPU, a ROM, a RAM, an HDD, and the like are connected via a bus, or configured to be made up of one-chip LSI and the like.

The ECU 35 is connected to the fuel injection valves 24 and can control the fuel injection valves 24.

The ECU 35 is connected to the engine revolution detecting sensor 26 and can acquire the number of revolutions N detected by the engine revolution detecting sensor 26.

The ECU 35 is connected to the injection amount detecting sensor 27 and can acquire the injection amount f detected by the injection amount detecting sensor 27.

The ECU 35 is connected to the EGR valve 30 and can control the opening and closing of the EGR valve 30.

The ECU 35 is connected to the intake pressure detecting sensor 31 and the exhaust pressure detecting sensor 32, each of which is a differential pressure detecting means, and can acquire the intake pressure P1 detected by the intake pressure detecting sensor 31 and the exhaust pressure P2 detected by the exhaust pressure detecting sensor 32 and calculate an EGR differential pressure $\Delta P$ and an intake-and-exhaust pressure ratio $\pi$.

The ECU 35 is connected to the EGR gas temperature detecting sensor 33 and can acquire the EGR gas temperature Tegr detected by the EGR gas temperature detecting sensor 33.

The ECU 35 is connected to the opening degree detecting sensor 34 and can acquire the EGR-valve opening degree G detected by the opening degree detecting sensor 34.

The ECU 35 stores effective passage cross-sectional area maps R1, R2, . . . Rn (in the present embodiment, effective passage cross-sectional area maps R1, R2, R3, and R4) for calculating the effective passage cross-sectional area Ared of the EGR device 28 based on the EGR-valve opening degree G and the EGR differential pressure $\Delta P$. Also, the ECU 35 stores a selective map Ry for selecting one effective passage cross-sectional area map Rx out of the effective passage cross-sectional area maps R1, R2, R3, and R4 based on the number of revolutions N and the injection amount f.

The ECU 35 can select one effective passage cross-sectional area map Rx from the selective map Ry based on the number of revolutions N and the injection amount f acquired. The ECU 35 can calculate the effective passage cross-sectional area Ared from one effective passage cross-sectional area map Rx selected based on the intake pressure P1, the exhaust pressure P2, the EGR gas temperature Tegr, and the EGR-valve opening degree G and control the opening and closing of the EGR valve 30.

Figure 9:
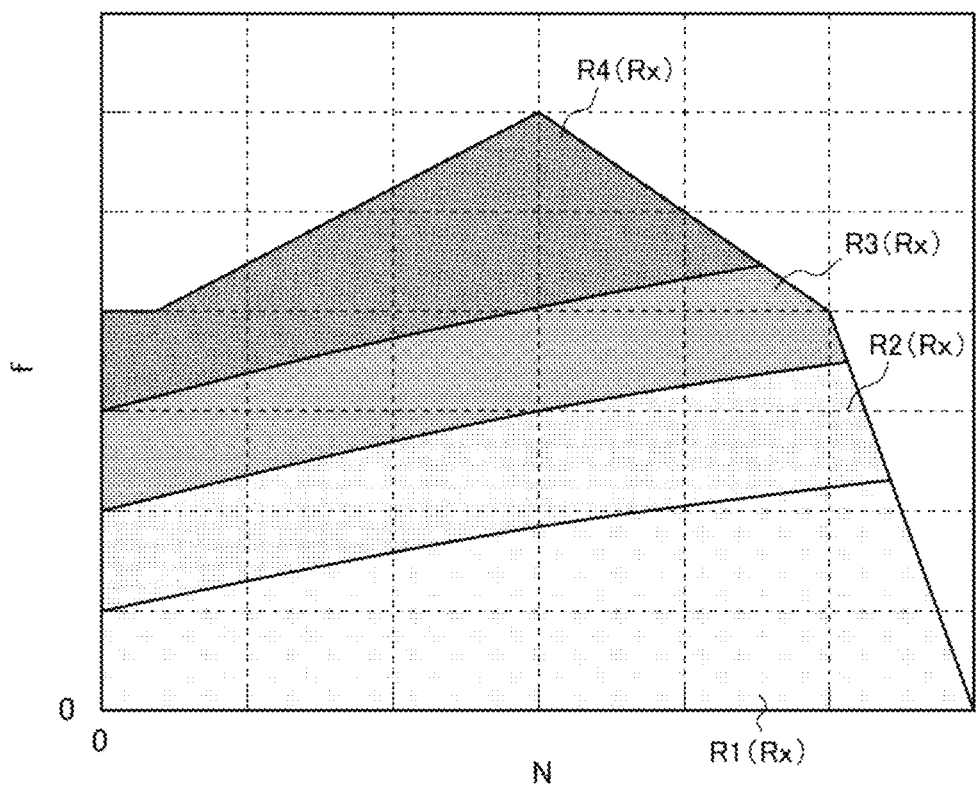
FIG. 9 is a view illustrating the selective map of the engine according to the third embodiment.
Figure 10:
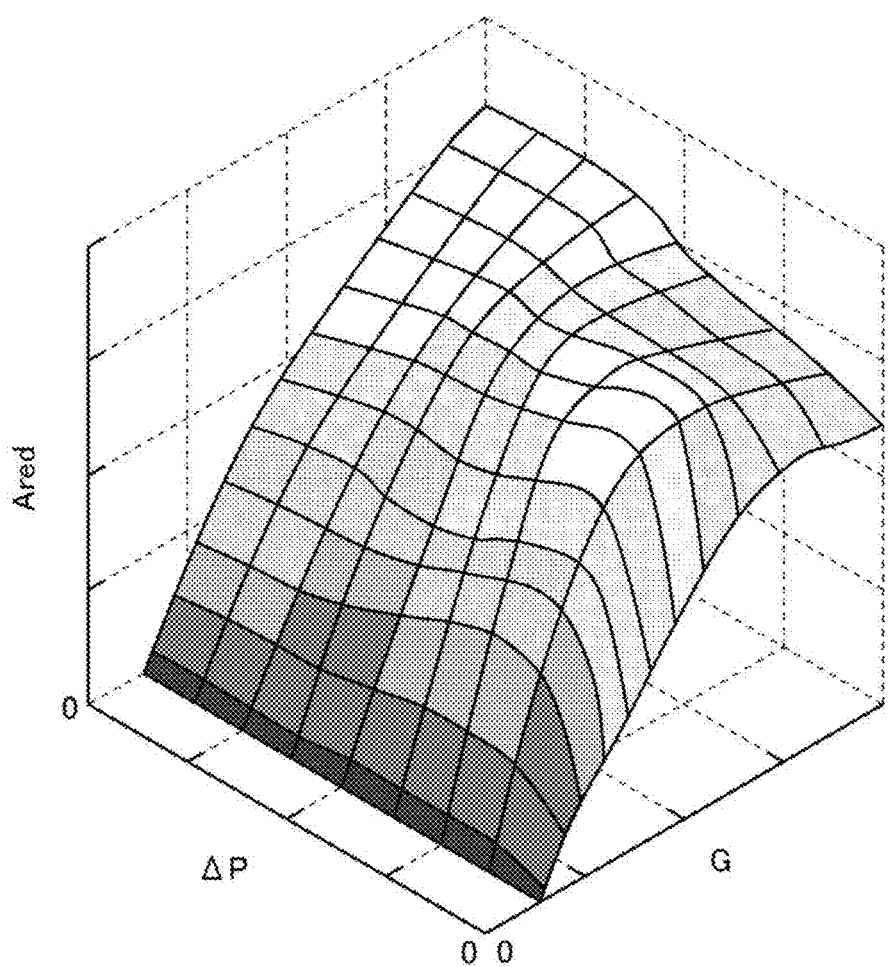
FIG. 10 is a view illustrating an effective passage cross-sectional area of an EGR device under predetermined conditions of the engine according to the third embodiment.

Hereinafter, the control mode of calculating EGR gas weight Megr in the EGR device 28 of the engine 21 according to the third embodiment will be described referring to FIGS. 9 to 11.

The ECU 35 calculates the EGR differential pressure $\Delta P$ represented by Expression 1 below based on the intake pressure P1 and the exhaust pressure P2 acquired and calculates the intake-and-exhaust pressure ratio $\pi$ represented by Expression 2 below. Subsequently, as illustrated in FIG. 9, the ECU 35 selects the effective passage cross-sectional area map Rx from the selective map Ry based on the number of revolutions N and the injection amount f acquired. Furthermore, as illustrated in FIG. 10, the ECU 35 calculates the effective passage cross-sectional area Ared from the effective passage cross-sectional area map Rx selected based on the EGR differential pressure $\Delta P$ calculated and the EGR-valve opening degree G acquired. Then, the ECU 35 calculates the EGR gas weight Megr represented by Expression 3 below based on the exhaust pressure P2 and the EGR gas temperature Tegr acquired, the intake-and-exhaust pressure ratio π and the effective passage cross-sectional area Ared calculated, an exhaust specific heat ratio κ, which is a constant, and a gas constant R.

$$\Delta P = P2 - P1 \quad \text{[Expression 1]}$$

$$\pi = P1/P2 \quad \text{[Expression 2]}$$

$$Megr = Ared \times P2 \times \sqrt{\frac{2 \times \kappa}{(\kappa - 1) \times R \times Tegr} \times (\pi^{2/\kappa} - \pi^{(+1/\kappa)})} \quad \text{[Expression 3]}$$

Next, the control mode of calculating the EGR gas weight Megr in the EGR device 28 of the engine 21 will be specifically described.

Figure 11:
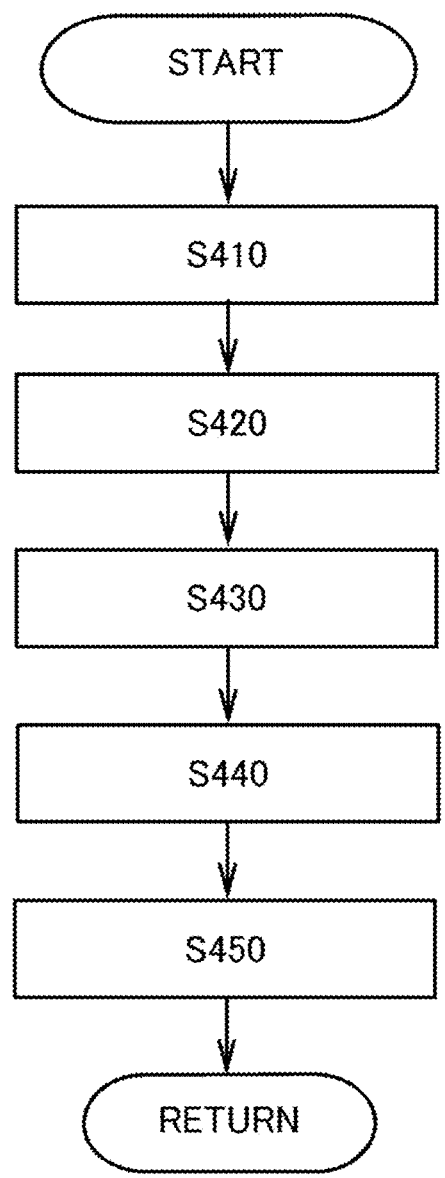
FIG. 11 is a view illustrating a flowchart representing the control mode of calculating the effective passage cross-sectional area of the EGR device of the third embodiment of the engine.

As illustrated in FIG. 11, at Step S410, the ECU 35 acquires the number of revolutions N detected by the engine revolution detecting sensor 26, the injection amount f detected by the injection amount detecting sensor 27, the EGR-valve opening degree G detected by the opening degree detecting sensor 34, the intake pressure P1 detected by the intake pressure detecting sensor 31, the exhaust pressure P2 detected by the exhaust pressure detecting sensor 32, and the EGR gas temperature Tegr detected by the EGR gas temperature detecting sensor 33 and allows the Step to transfer to Step S420.

At the Step S420, the ECU 35 calculates the EGR differential pressure ΔP and the intake-and-exhaust pressure ratio π from the intake pressure P1 and the exhaust pressure P2 acquired and allows the Step to transfer to Step S430.

At the Step S430, the ECU 35 selects one effective passage cross-sectional area map Rx from the selective map Ry based on the number of revolutions N and the injection amount f acquired and allows the Step to transfer to Step S440.

At the Step S440, the ECU 35 calculates the effective passage cross-sectional area Ared from the effective passage cross-sectional area map Rx based on the EGR differential pressure ΔP calculated and the EGR-valve opening degree G acquired and allows the Step to transfer to Step S450.

At the Step S450, the ECU 35 calculates the EGR gas weight Megr from the intake pressure P2 and the EGR gas temperature Tegr acquired, the intake-and-exhaust pressure ratio π and the effective passage cross-sectional area Ared calculated, the exhaust specific heat ratio κ, which is a constant, and the gas constant R and controls the EGR-valve opening degree G based on the EGR gas weight Megr calculated. The ECU 35 allows the Step to transfer to the Step S410.

Figure 12:
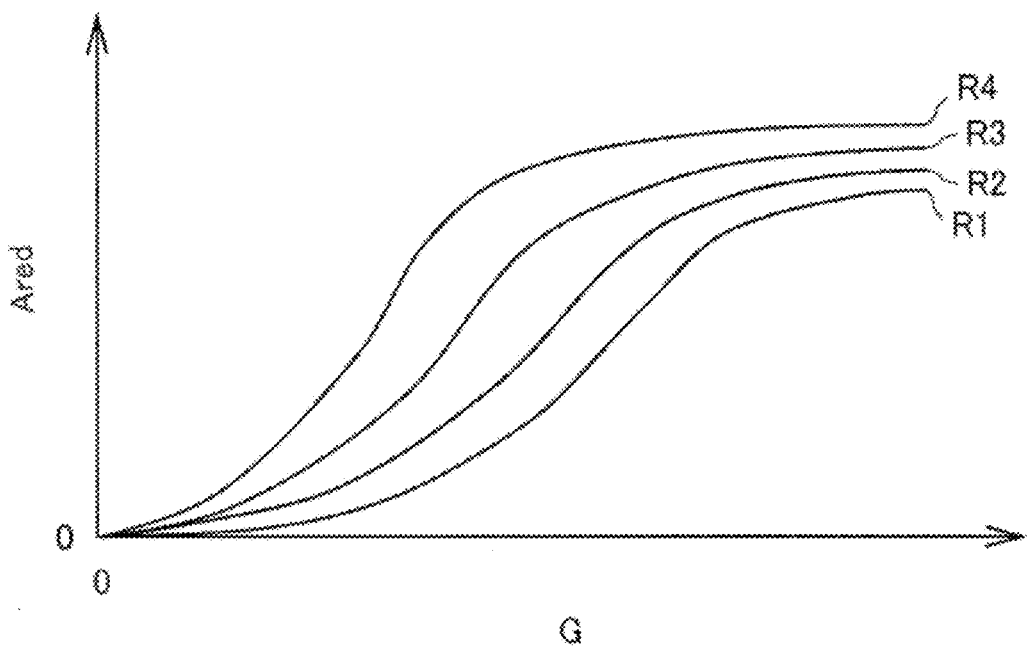
FIG. 12 is a view illustrating the effective passage cross-sectional area of the EGR device under each predetermined condition in a case where the different pressure in the engine is equal.

That is, as illustrated in FIG. 12, regarding the EGR device 28, when the states of the number of revolutions N and the injection amount f of the engine 21 are different, there is a case where, even when the EGR differential pressure ΔP and the EGR-valve opening degree G are identical, the values of the effective passage cross-sectional area Ared are different. Accordingly, the ECU 35 controls in such a manner as to select the optimal effective passage cross-sectional area map Rx based on the states of the number of revolutions N and the injection amount f (see FIG. 9).

Accordingly, even when the operating states of the engine 21 are different, the EGR gas weight Megr is calculated based on the EGR differential pressure ΔP and the EGR-valve opening degree G Consequently, the effect of suppressing the generation of nitrogen oxide by means of the EGR device 28 is appropriately given.

As descried above, regarding the engine 21 according to the third embodiment, the engine 21 includes the EGR device 28 that recirculates part of the exhaust gas into the intake air as the EGR gas, and the engine 21 further includes the EGR valve 30 that limits the EGR gas weight Megr, the intake pressure detecting sensor 31 and the exhaust pressure detecting sensor 32 that are a differential pressure detecting means for detecting differential pressure between the intake pressure P1 and the exhaust pressure P2, the ECU 35, which is a control device, that changes the EGR-valve opening degree G of the EGR valve 30 and adjusts the EGR gas weight Megr, and the ECU 35 includes the plurality of effective passage cross-sectional area maps Rx for calculating the effective passage cross-sectional area Ared of the EGR device 28 from the EGR-valve opening degree G and the EGR differential pressure ΔP and calculates the effective passage cross-sectional area Ared from one effective passage cross-sectional area map Rx selected from the plurality of effective passage cross-sectional area maps R1, R2, R3, and R4.

Also, the ECU 35 selects one effective passage cross-sectional area map Rx from the plurality of effective passage cross-sectional area maps R1, R2, R3, and R4 based on the number of revolutions N and the injection amount f of the engine 21.

With this constitution, the effective passage cross-sectional area map Rx in accordance with the operating states of the engine 21 is selected from among the plurality of effective passage cross-sectional area maps R1, R2, R3, and R4. Accordingly, the EGR gas weight Megr based on the operating states can be calculated.

Next, the engine 21 of a fourth embodiment of the engine 21 according to the present invention will be described referring to FIGS. 8, 13, and 14. It is noted that, in the embodiment described below, regarding the same matters of the embodiments that have been already described, their specific descriptions are omitted, and the following description focuses on the different matters.

As illustrated in FIG. 8, the ECU 35 can select one effective passage cross-sectional area map Rx, out of the effective passage cross-sectional area maps R1, R2, . . . Rn (in the present embodiment, the effective passage cross-sectional area maps R1, R2, R3, and R4) for calculating the effective passage cross-sectional area Ared of the EGR device 28 based on the exhaust pressure P2 and the intake-and-exhaust pressure ratio π.

Hereinafter, the control mode of calculating the EGR gas weight Megr in the EGR device 28 of the engine 21 according to the third embodiment will be described.

Figure 13:
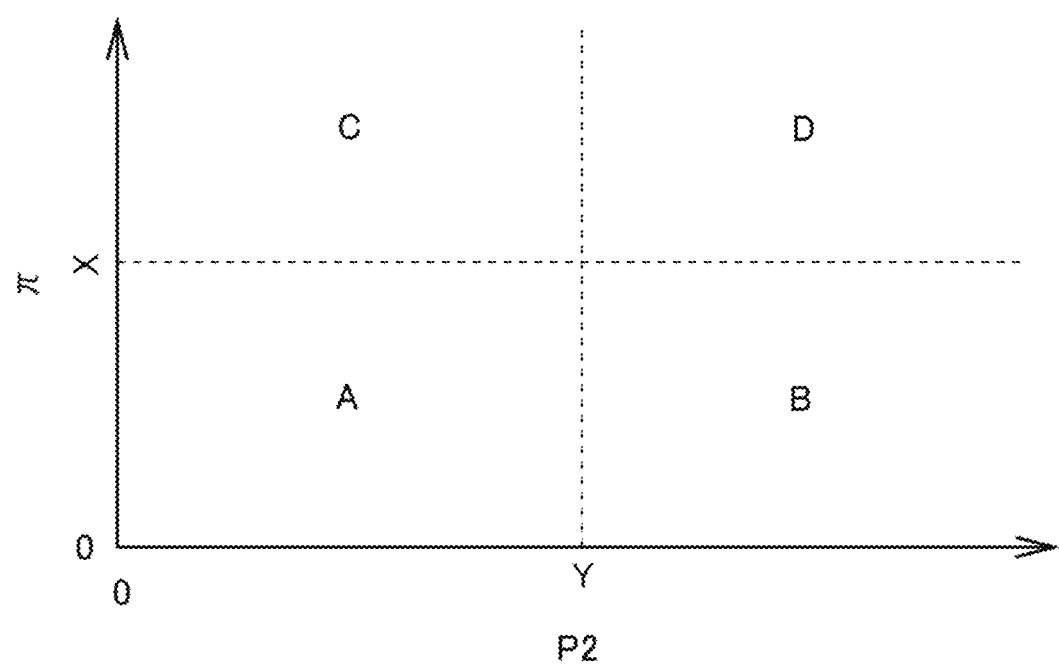
FIG. 13 is a view illustrating the threshold value of the effective passage cross-sectional area of the EGR device of a fourth embodiment of the engine.
Figure 14:
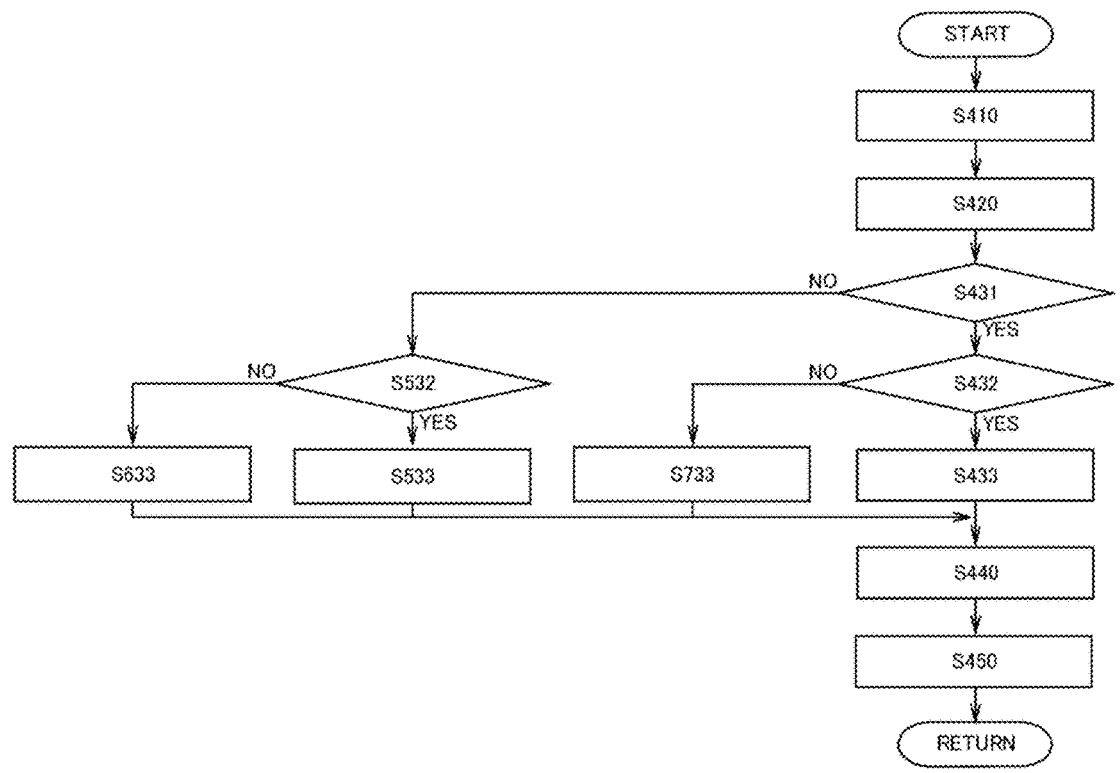
FIG. 14 is a view illustrating a flowchart representing the control mode of calculating the effective passage cross-sectional area of the EGR device of the fourth embodiment of the engine.

As illustrated in FIG. 13, the ECU 35 selects the effective passage cross-sectional area map Rx suitable for calculating the effective passage cross-sectional area Ared of the EGR device 28 based on the exhaust pressure P2 acquired and the intake-and-exhaust pressure ratio π calculated. Specifically, when the intake-and-exhaust pressure ratio π is higher than a predetermined value X, and the exhaust pressure P2 is higher than a predetermined value Y (an area D in FIG. 13), the ECU 35 selects the effective passage cross-sectional area map R4. Also, when the intake-and-exhaust pressure ratio π is higher than the predetermined value X, and the exhaust pressure P2 is equal to or lower than the predetermined value Y (an area C in FIG. 13), the ECU 35 selects the effective passage cross-sectional area map R3. Also, when the intake-and-exhaust pressure ratio π is equal to or lower than the predetermined value X, and the exhaust pressure P2 is higher than the predetermined value Y (an area B in FIG. 13), the ECU 35 selects the effective passage cross-sectional area map R2. Also, when the intake-and-exhaust pressure ratio π is equal to or lower than the predetermined value X, and the exhaust pressure P2 is equal to or lower than the predetermined value Y (an area A in FIG. 13), the ECU 35 selects the effective passage cross-sectional area map R1.

Next, the control mode of calculating the EGR gas weight Megr in the EGR device 28 of the engine 21 will be specifically described.

The ECU 35 performs the same control as the aforementioned control from the Step S410 to the Step S420.

At Step S431, the ECU 35 determines whether or not the intake-and-exhaust pressure ratio π is higher than the predetermined value X. As a result, when the ECU 35 determines that the intake-and-exhaust pressure ratio π is higher than the predetermined value X, the ECU 35 allows the Step to transfer to Step S432. In contrast, when the ECU 35 determines that the intake-and-exhaust pressure ratio π is lower than the predetermined value X, the ECU 35 allows the Step to transfer to Step S532.

At the Step S432, the ECU 35 determines whether or not the exhaust pressure P2 is higher than the predetermined value Y. As a result, when the ECU 35 determines that the exhaust pressure P2 is higher than the predetermined value Y, the ECU 35 allows the Step to transfer to Step S433. In contrast, when the ECU 35 determines that the exhaust pressure P2 is lower than the predetermined value Y, the ECU 35 allows the Step to transfer to Step S733.

At the Step S433, the ECU 35 selects the effective passage cross-sectional area map R4 and allows the Step to transfer to the Step S440.

The ECU 35 performs the same control as the aforementioned control from the Step S440 to the Step S450.

At the Step S532, the ECU 35 determines whether or not the exhaust pressure P2 is higher than the predetermined value Y. As a result, when the ECU 35 determines that the exhaust pressure P2 is higher than the predetermined value Y, the ECU 35 allows the Step to transfer to Step S533. In contrast, when the ECU 35 determines that the exhaust pressure P2 is lower than the predetermined value Y, the ECU 35 allows the Step to transfer to Step S633.

At the step S533, the ECU 35 selects the effective passage cross-sectional area map R2 and allows the Step to transfer to the Step S440.

At the step S633, the ECU 35 selects the effective passage cross-sectional area map R1 and allows the Step to transfer to the Step S440.

At the step S733, the ECU 35 selects the effective passage cross-sectional area map R3 and allows the Step to transfer to the Step S440.

As described above, regarding the engine 21 according to the fourth embodiment, the ECU 35 selects one effective passage cross-sectional area map Rx out of the plurality of effective passage cross-sectional area maps R1, R2, R3, and R4 based on the intake-and-exhaust pressure ratio π between the intake pressure P1 and the exhaust pressure P2, and the exhaust pressure P2. With this constitution, the effective passage cross-sectional area map Rx in accordance with the operating states of the engine 21 is selected from among the plurality of effective passage cross-sectional area maps R1, R2, R3, and R4. Accordingly, the EGR gas weight Megr based on the operating states can be calculated.

INDUSTRIAL APPLICABILITY

The present invention can be utilized for an engine that includes a fuel injection control device.

REFERENCE SIGNS LIST

1 Engine
10 Fuel injection control device
16 Fuel injection detecting unit
Nt Target number of revolutions
P Atmospheric pressure
Tm Coolant temperature
Qs Standard injection amount
ITs Standard injection time
Wc Coolant correction amount
Tm1 First predetermined temperature
21 Engine
28 EGR device
30 EGR valve
31 Intake pressure detecting sensor
32 Exhaust pressure detecting sensor
35 ECU
Megr EGR gas weight
G EGR-valve opening degree
ΔP EGR differential pressure
Ared Effective passage cross-sectional area
Rx Effective passage cross-sectional area map

The invention claimed is:

1. An engine comprising:
an exhaust gas recirculation (EGR) device structured to recirculate part of exhaust gas as EGR of the engine as EGR gas into intake air;
an EGR valve structured to limit a weight of the EGR gas;
a differential pressure detector comprising an intake pressure detecting sensor and an exhaust pressure detecting sensor, the differential pressure detector being structured to detect differential pressure between an intake pressure and an exhaust pressure; and
a control device configured to change an opening degree of the EGR valve and adjust the EGR gas weight, the control device comprising a plurality of effective passage cross-sectional area maps for calculating the effective passage cross-sectional area of the EGR device from the opening degree of the EGR valve and the differential pressure,
wherein the control device is configured to determine whether or not an intake-and-exhaust pressure ratio between the intake pressure and the exhaust pressure is higher than a predetermined value, and whether or not an exhaust pressure is higher than a predetermined value based on the exhaust pressure and the intake-and-exhaust pressure ratio, and
wherein the control device is configured to calculate the effective passage cross-sectional area from one effective passage cross-sectional area map selected from the plurality of effective passage cross-sectional area maps based on a result that the control device determines.

2. The engine according to claim 1, wherein the control device is configured to select the one effective passage cross-sectional area map based on a number of revolutions and an injection amount of the engine.

3. The engine according to claim 1, wherein the control device is configured to select the one effective passage cross-sectional area map based on an intake-and-exhaust pressure ratio between the intake pressure and the exhaust pressure, and the exhaust pressure.

* * * * *